United States Patent [19]

Casacci et al.

[11] 4,422,826
[45] Dec. 27, 1983

[54] PROPELLER RUNNER HAVING SWIVELLING BLADES FOR TURBINES

[75] Inventors: Severin Casacci, La Tronche; Paul Jarriand, Grenoble, both of France

[73] Assignee: Neyrpic, Grenoble, France

[21] Appl. No.: 252,101

[22] Filed: Apr. 8, 1981

[30] Foreign Application Priority Data

Apr. 24, 1980 [FR] France .................. 80 09243

[51] Int. Cl.³ .............................................. F03B 3/06
[52] U.S. Cl. ........................ 416/157 R; 416/168 A
[58] Field of Search .......... 416/157 R, 48, 168 R, 416/168 A, 245 A, 154, 156

[56] References Cited

U.S. PATENT DOCUMENTS

| | | | |
|---|---|---|---|
| 2,156,102 | 7/1935 | Austin | 416/157 X |
| 2,255,920 | 9/1941 | Englesson | 416/157 R |
| 2,283,128 | 5/1942 | Ring | 416/157 |

FOREIGN PATENT DOCUMENTS

| | | | |
|---|---|---|---|
| 145552 | 4/1950 | Australia | 416/157 |
| 194015 | 3/1967 | U.S.S.R. | 416/157 |
| 393472 | 12/1973 | U.S.S.R. | 416/157 |
| 541043 | 1/1977 | U.S.S.R. | 416/157 |

*Primary Examiner*—Harvey C. Hornsby
*Assistant Examiner*—Shewen Bian
*Attorney, Agent, or Firm*—Pollock, Vande Sande & Priddy

[57] ABSTRACT

A propeller runner having swivelling blades, each integral with a journal engaged in two bearings respectively in the outer portion and the inner portion of the runner, and equipped with lateral connecting rods for manipulation in rotation.

The inner central portion of the hub of the runner includes a spider 29 each arm of which consists of a radial journal 31 prolonged by a threaded portion 32. Each blade journal 23 is engaged over a spider journal 31 with a bearing 26 and is held by a nut 33 screwed onto the portion 32 with the interposition of a thrust bearing 30. The spider 29 for a four-bladed runner preferably consists of a core 39 through which passes a shaft 40.

The invention is applicable to propeller runners having swivelling blades for turbines.

3 Claims, 4 Drawing Figures

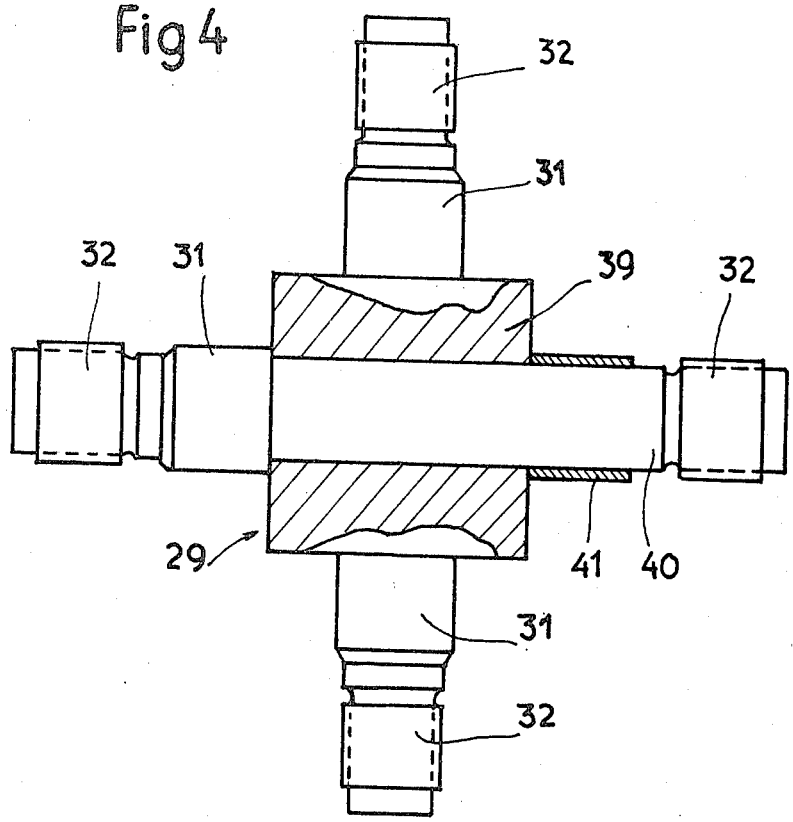

PROPELLER RUNNER HAVING SWIVELLING BLADES FOR TURBINES

FIELD OF THE INVENTION

The present invention refers to a propeller turbine runner having swivelling blades for varying the pitch of the propeller and thereby the operational characteristics of the turbine.

PRIOR ART

Usually the swivelling blades of the propeller runners are assembled each upon a journal which in turn is mounted in the hub of the runner along an axis perpendicular to the general axis of the runner. Attached FIGS. 1 and 2 give an example of such a conventional mounting. FIG. 1 represents in a simplified fashion in longitudinal section along the axis of the runner the articulation of one blade and its journal on the hub of the runner. FIG. 2, which is a partial view along II—II in FIG. 1, shows the control lever for swivelling the blade.

Here the blade 1 is assembled by screws 2 on the journal 3. The whole is held onto the body of the hub by the two bearings 5 and 6 on the outer portion 8 and on the inner portion 9 of the body of the hub, 9 respectively, and by the thrust bearing 10 bearing against the outer portion 8. In addition, and in an equally conventional fashion, the body of the journal 3 includes at the side a portion 12 which forms a lever (see FIG. 2) and the end of which is intended to be connected to a connecting rod for manipulation. The manipulator device for swivelling the blades is illustrated herein in a simplified fashion by the central rod 14 connected to a servomotor (not shown) and enabling axial movement of the rod. A plate 16 connected to the rod 14 supports for each blade one of the ends of the connecting rods 17 the other end of which is hinged onto the lever 12.

In service, the blade is subjected to a system of forces which may be resolved into:
 a tangential component perpendicular both to the axis of the turbine and to the axis of the journal; this is the one which determines the driving torque of the turbine;
 a radial thrust perpendicular to the axis of the journal but parallel with the axis of the turbine; and
 a centrifugal component parallel with the axis of the journal.

In the runner, the tangential component and the radial thrust are balanced by reaction of the two bearings 5 and 6; the torque resulting from these two components, which tends to make the blade turn about the axis of its journal, is balanced by the force from the servomotor applied to the lever 12 on the journal. The centrifugal component is balanced by the reaction from the outer portion of the body of the hub by way of the thrust bearing 10.

This usual arrangement offers numerous disadvantages, in the first place because of the very large centrifugal forces which can reach several thousands of tons, as may be observed in the case of running away of large turbines. These centrifugal forces are in fact transmitted to an outer portion of large diameter which includes for each blade an opening of large diameter corresponding with the diameter of the foot of the blade. The presence of numerous large diameter orifices reduces the strength of this outer portion 8, the calculation of which is effected according to the theory of perforated shells of large dimension; the result is a deformation of the outer body of the hub and a tilting of the plane of the thrust bearing 10, which can bring about an asymmetrical distribution of the pressures against the thrust-bearing. This leads to the imposition of heavy thicknesses for the spherical skirt of the hub and to production of the body of the hub by casting.

In addition, because of the large diameter of the thrust bearing ring 10, the frictional torque resisting the force for regulation of the inclination of the blade is high and demands a powerful servomotor and equally heavy transmission members. All this adds up to give the hub a large diameter, at the expense of the diameter available for the blades.

The present invention applies a new solution to the mounting of the journals of blades on the hub of a propeller runner.

SUMMARY OF THE INVENTION

The invention is applied to a propeller runner having swivelling blades, in which each blade is mounted along a radial direction in a hub, each blade has at its root first and a second cylindrical bearing surface which are spaced from one another and coaxial and define the axis of rotation of the blade about itself, this rotation being intended for the regulation of the incidence of the blade. Each blade is equipped with lateral connecting rods the movement of which is controlled simultaneously by means internal jointly the runner in order to regulate to the angle of incidence of all of the blades.

In accordance with the invention, the first cylindrical bearing surface of each blade is engaged in a bearing formed in the outer portion of the hub, the second cylindrical bearing surface of each blade is engaged around a cylindrical journal each journal is fixed rigidly and radially around a central piece which in turn is connected rigidly to a portion of the hub which extends towards the center, and each journal forms in addition an axial thrust bearing for the corresponding blade.

In accordance with a particular embodiment of the invention for the case of a four-bladed runner, the spider consists of a core carrying two diametrically opposite journals, and through it passes perpendicularly to the axis of these first two journals a shaft which is locked in the core and the two ends of which constitute the other two journals.

Likewise in accordance with a preferred embodiment, the connecting rods for manipulating the blades are hinged onto the movable body of an axial jack the fixed piston and rod of which are integral with the spider on the axis of the runner.

BRIEF DESCRIPTION OF THE DRAWINGS

The invention will be better understood by referring to a particular embodiment given by way of example and represented by the other Figures attached. FIG. 4 gives the detail of the spider along section line IV—IV in FIG. 3.

DETAILED DESCRIPTION

Figure 1:
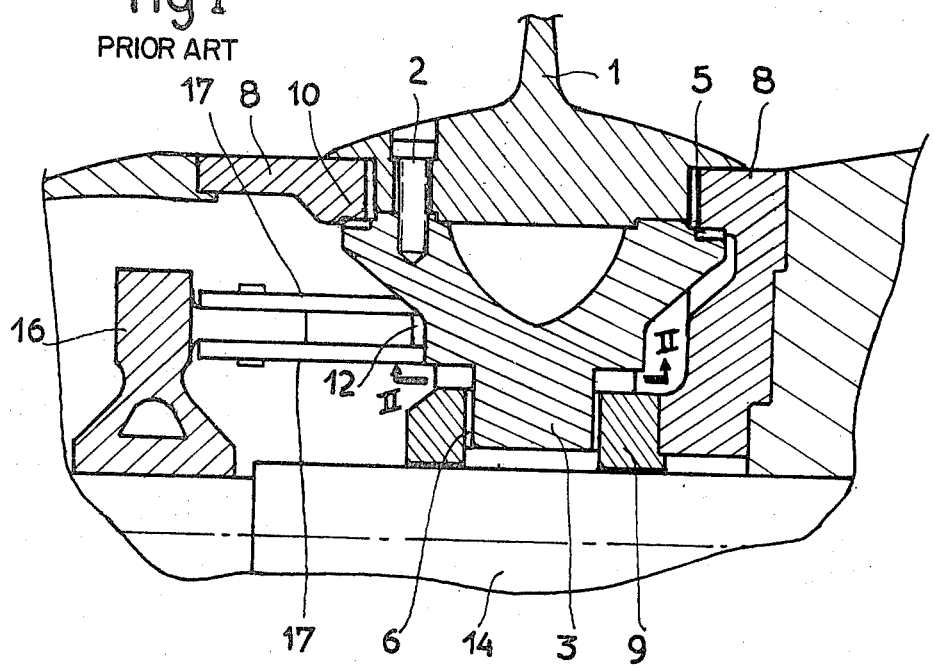
Figure 2:
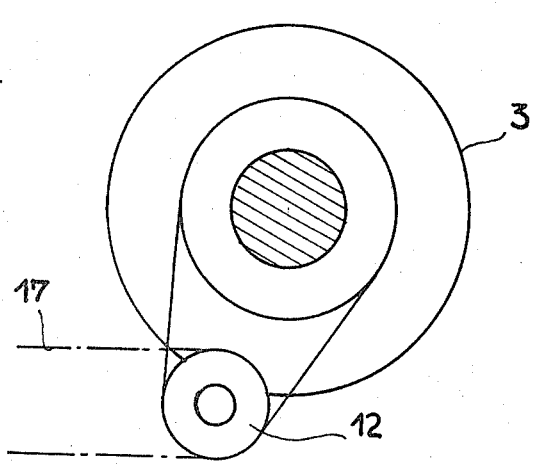

In this new solution, the blade 21 is in the same fashion assembled onto a journal 23, and the whole is held in the outer portion 28 of the body of the hub by a bearing 25. The hub is equipped in its central portion with a fixed spider 29 which for each blade includes a radial journal 31 prolonged by a rod 32 having a threaded portion. The journal 23 is engaged by the bore at its end over the journal 31 on the spider, where it is held radially by the bearing 26. The radial journal 23 is held axially onto the jounal 31 by a nut 33 engaged onto the rod 32, with the interposition of an axial thrust bearing 30.

The outer portion 28 of the hub exhibits at one end a radial face 50 which is applied against the radial face 52 which lies at the end of the torque transmission shaft 51. In this position, the hub is fixed rigidly and coaxially to the shaft 51. On the other end of the hub is mounted coaxially a nose cone 54 which surrounds and encloses all of the internal mechanism for support of the blades and for control of the angle of incidence of these blades. The hub includes a portion 53 which is directed towards the center and which is connected rigidly to the central piece which forms the spider 29. The maximum diameters of the nose cone 54, the hub and the shaft 51 are substantially the same so as to facilitate the flow of the fluid which occurs along the direction axial to the runner round the hub.

The spider 29 here consists of two pieces (FIG. 4), one of which is a core 39 which carries two radial journals 31 opposite one another in alignment, each prolonged by a threaded portion 32. The core 39 is pierced by a bore perpendicular to the axis of these two journals in order to receive a transverse shaft 40 the two ends of which likewise constitute journals 31,32. The shaft 40 is positioned and locked in the bore in the core 39 by a shoulder on one of the journals 31 and a bush 41 bearing against the other face of the core.

Figure 3:
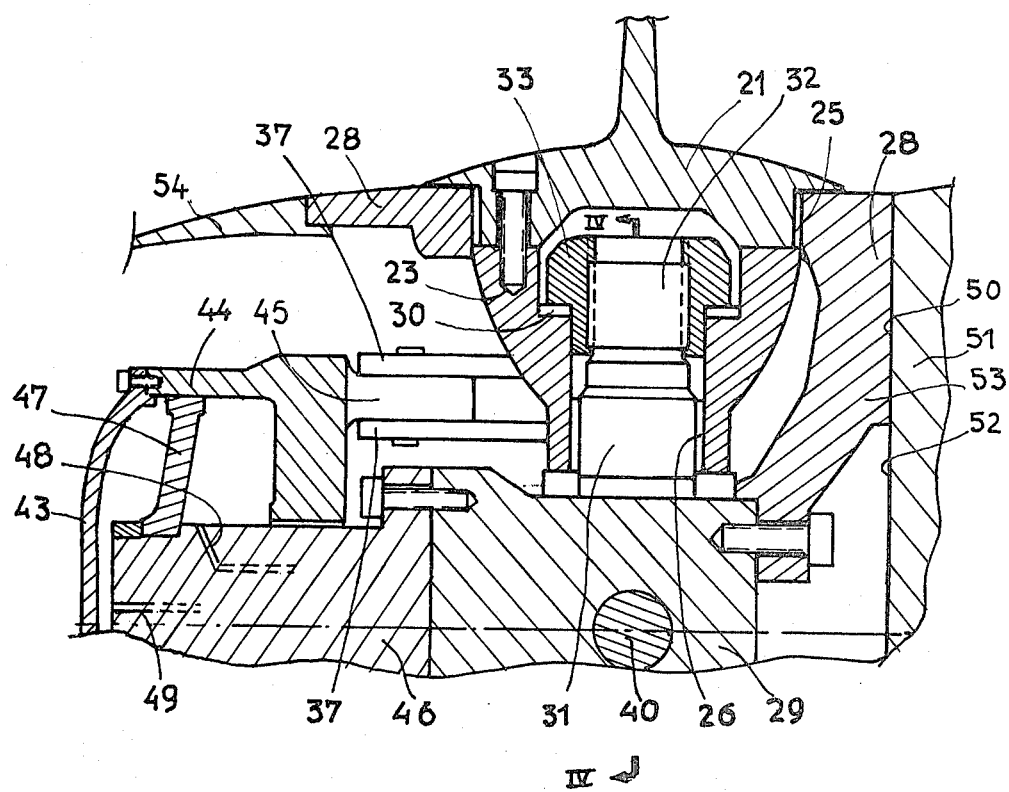
FIG. 3 is similar to FIG. 1 but presents the new solution in accordance with the invention.

Returning to FIG. 3 it will be seen that each journal 23 and thereby each blade 21 is controlled in rotation by the axial movement of the body of a jack 44 which carries at the base of it bosses 45 onto which are hinged the connecting-rods 37 for manipulation. The jack 44, closed by the cap 43, moves along a fixed rod 46 integral with the spider 29 which in turn is integral with the hub 28. The piston 47 integral with the rod 46 separates the two chambers of the jack, each including respectively a supply duct 48 or 49. Here there have been shown simply the outlets from the ducts 48 and 49 which in the usual way are connected to a regulator which in turn is fed with oil under pressure. According to whether one or the other of the two chambers is fed, the jack 44 is moved axially in order to regulate the swivelling of the blades 21.

It will easily be seen that in this arrangement the tangential component and the radial thrust of the forces on the blade are, as in the usual arrangement, balanced by the reaction from the bearings 25 and 26 and by the force from the servomotor transmitted through the connecting rods 37. But the centrifugal component is here transmitted in the form of a simple pull against the arm journal 31, 32 of the spider.

Thus the heavy centrifugal forces are applied to a part of relatively small dimensions which can easily be dimensioned in order to resist these forces. In addition, the deformations of the thrust bearing 30 which is about equidistant from the bearings 25 and 26 remain symmetrical with respect to the axis and lead to a uniform distribution of the load against the thrust bearing ring. Furthermore, the reduction in the diameter of the thrust bearing has the result of a considerable reduction in the frictional torque, and also enables the power and bulk of the driving mechanism to be reduced for manipulation.

Finally it will be noted that the outer portion 28 of the body, which no longer has to withstand the centrifugal forces, is only subjected to the reaction from the bearings 25; hence it may be substantially lightened, in particular by a considerable reduction in the thickness of the spherical shell between the bores bearing the feet of the blades. The body of the hub may then be produced by mechanical welding instead of casting, which reduces the cost very appreciably. Thus the hub may be given a smaller diameter which enables a smaller value to be obtained of the ratio of the mean diameter to the diameter of the blades, and the power referred to the surface of the blades to be increased. The invention is not strictly limited to the embodiment which has been described by way of example, but also covers realizations which might differ from it only in detail, in variants of execution or by the employment of equivalent means.

Thus the invention could be applied also to a runner having any number of blades, the central fixed spider then having as many arms as blades, each arm forming a corresponding blade journal.

It will be noted, however, that the embodiment described for a runner having four blades enables a particularly interesting construction of the spider in two portions with a shaft passing through a core, which enables a mechanically welded construction which is cheaper than by casting.

In the case of a one-piece cast spider, one might also provide a mechanism for control of the swivelling of the blades by an axial rod of the same species as for the conventional design in accordance with FIG. 1, which in this case would pass through the spider. The solution by jack, illustrated in FIG. 3, offers the advantage of avoiding having an axial rod passing through the spider, i.e., of avoiding weakening the central portion of the spider; its resistance to the centrifugal forces is then obtained with a minimum radial bulk.

We claim:

1. A propeller runner having four swivelling blades radially mounted in a hub, each said blade having at its root spaced, coaxial first and second cylindrical bearing surfaces defining the axis of rotation of said blade about itself, this rotation being intended for governing the angle of incidence of said blade, lateral connecting rods on each blade the movement of which is controlled simultaneously by means internal to said runner so as to regulate jointly the angle of incidence of all of said blades, said first cylindrical bearing surface of each blade being engaged in a bearing formed in the outer portion of said hub, said second cylindrical bearing surface of each blade being engaged around a cylindrical journal, each said journal being rigidly and radially fixed around a central core which in turn is rigidly connected to a portion of said hub extending towards the center, said core carrying two diametrically opposite journals, a shaft passing through said core perpendicularly to the axis of said two journals, said shaft being locked in said core and having two ends which constitute two further journals, each said journal forming an axial thrust bearing for the corresponding blade.

2. A propeller runner according to claim 1, wherein the outer portion of said hub is rigidly fixed onto the substantially radial face of the end of the torque transmission shaft in coaxial prolongation of said shaft, the outer portion of said hub supporting from the other side a nose cone which encloses the internal mechanism for support and control of the incidence of said blades.

3. A propeller runner according to claim 1 or 2, wherein said connecting-rods for manipulating said blades are hinged onto the movable body of an axial jack the piston and the rod of which are integral with said central core on the axis of said runner.

* * * * *